Patented Oct. 30, 1923.

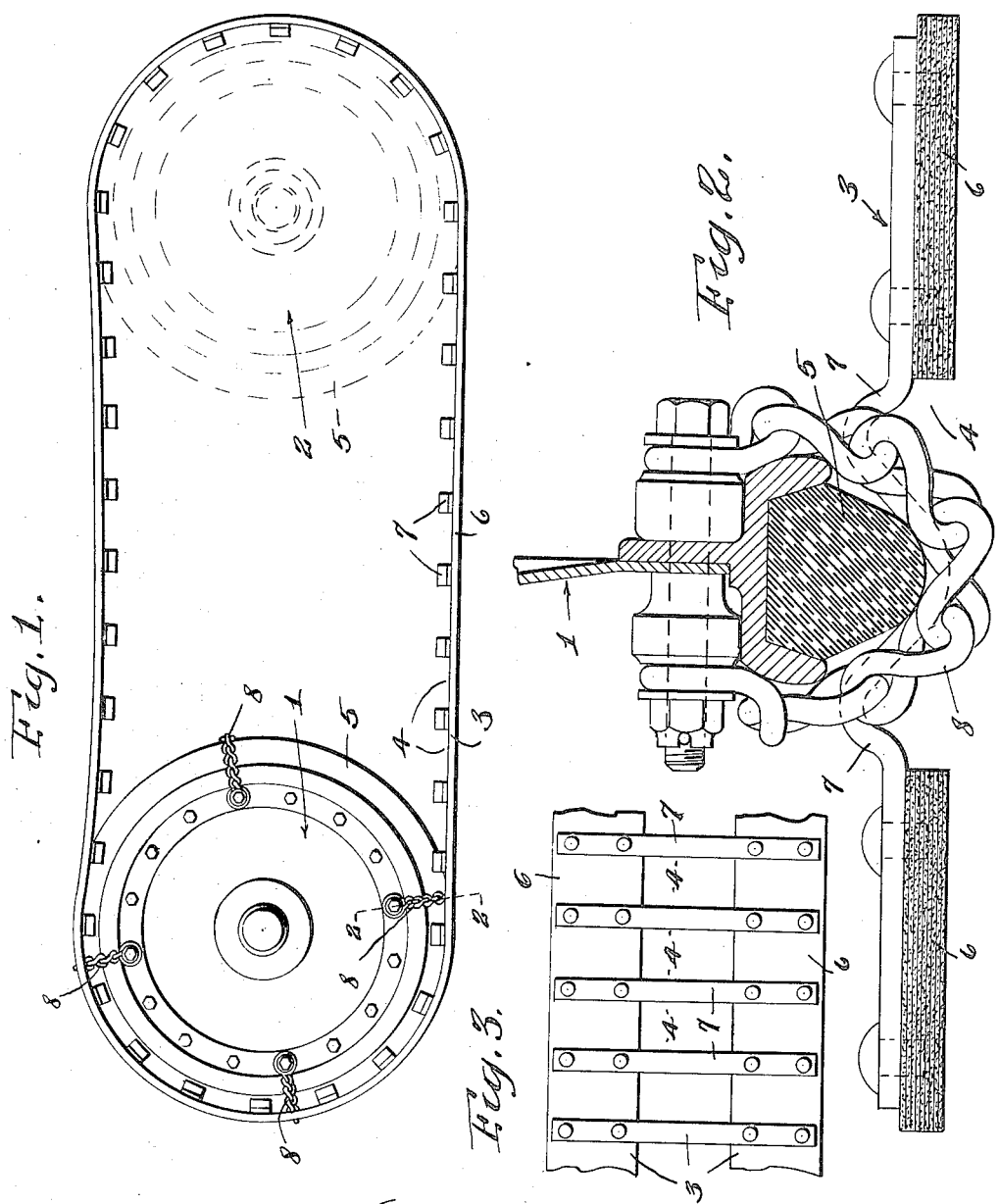

1,472,431

UNITED STATES PATENT OFFICE.

AURIN M. CHASE, OF SYRACUSE, NEW YORK.

ENDLESS-BELT TRACTOR.

Application filed March 19, 1921. Serial No. 453,606.

*To all whom it may concern:*

Be it known that I, AURIN M. CHASE, a citizen of the United States, and a resident of Syracuse, in the county of Onondaga and State of New York, have invented a certain new and useful Endless-Belt Tractor, of which the following is a specification.

This invention relates to endless tracks for tractors in which the endless track consists of a belt of flexible material running over the wheels such as described in my pending application, Sr. No. 437,038, filed January 13, 1921, and has for its object a particularly simple and efficient means for preventing the tractor wheel, that is, the wheel to which the power is applied, from slipping relatively to the belt.

The invention consists in the combinations and constructions hereinafter set forth and claimed.

In describing this invention, reference is had to the accompanying drawings in which like characters designate corresponding parts in all the views.

Figure 1 is an elevation of a tractor construction embodying my invention, the same including a pair of wheels and a flexible endless track belt running over the wheels.

Figure 2 is an enlarged sectional view on line 2—2, Fig. 1.

Figure 3 is a fragmentary plan view of the endless track belt.

This tractor construction comprises a pair of wheels, one of which is a tractor wheel to which power is applied, a tractor belt running over the wheels, one of the wheels having one or more members extending across the periphery of the wheel for engaging the belt and preventing slipping of the tractor wheel relatively to the belt.

1 and 2 are respectively, the wheels, one of the wheels as the wheel 1 being a tractor wheel to which power is applied in any suitable manner.

3 designates the track which is a belt composed of flexible material in contradistinction to hinged sections. As here shown, the belt is formed with openings 4 along its median line and wheels 1, 2 are provided with tires 5 which run in line with the openings 4.

Preferably, the belt consists of belt units 6 spaced apart and cross members 7 at intervals, the cross members dividing the space between the belt units 6 into the openings 4 along the median line of the belt. The tires of the wheels engage these cross members and the belt units project on opposite sides of the wheel.

The cross members on the tractor wheel 1 preferably consists of one or more chains or cables 8 extending across the tire 5 to engage the inner faces of the belt 3 or the cross members 7 or the ground between the units 6, these chains 8 preventing slipping of the tractor wheel in the belt. The belt, per se forms the subject matter of my pending application, referred to.

I am aware that non-skid chains and the like have been used on the wheels of ordinary motor vehicles, but the use of the chains 8 or equivalent means with a flexible tractor belt tractor is an entirely different proposition from the non-skid chains on tires, and the problem of using a flexible tractor belt and also preventing slipping thereof relatively to the wheels, has never been satisfactorily solved although this problem has been a vexatious one in the development of tractors especially during the war. The cross chains 8 or their equivalent on tractor wheels makes it practical to use flexible tractor belts especially of the form shown herein.

What I claim is:

In a tractor, the combination of a pair of wheels a tractor belt running over the wheels and comprising a pair of endless belt units of flexible material spaced and running on opposite sides of the tread of the wheel and cross bars connecting the units and extending across the space between the belts, the wheels being provided with tires running in the space between the belt units and engaging the cross bars and a non-slipping member extending around the tire across the tread thereof, substantially as and for the purpose specified.

In testimony whereof, I have hereunto signed my name, at Syracuse, in the county of Onondaga, and State of New York, this 21st day of January, 1921.

AURIN M. CHASE.